United States Patent [19]

Shin et al.

[11] Patent Number: 5,206,048
[45] Date of Patent: Apr. 27, 1993

[54] PROCESS FOR MANUFACTURING POTATO CHIPS

[75] Inventors: Zae I. Shin, Incheon; Hyung J. Lee, Seoul; Sung J. Yang; Un S. Lee, both of Kyungki, all of Rep. of Korea

[73] Assignee: Nong Shim Co., Ltd., Seoul, Rep. of Korea

[21] Appl. No.: 707,461

[22] Filed: May 30, 1991

[51] Int. Cl.$^5$ .............................................. A23L 1/217
[52] U.S. Cl. ................................... 426/637; 426/438; 426/808
[58] Field of Search ................ 426/637, 438, 441, 808

[56] References Cited

U.S. PATENT DOCUMENTS 3,649,305  3/1972  Wilder ............................ 426/637 X

FOREIGN PATENT DOCUMENTS

| 750479 | 10/1970 | Belgium | 426/441 |
| 1-273540 | 11/1989 | Japan | 426/637 |
| 2078081 | 1/1982 | United Kingdom | 426/438 |
| 2220553 | 1/1990 | United Kingdom | 426/637 |

OTHER PUBLICATIONS

Chiang et al., "Effect of Variety, Frying Condition on the Quality of French Fry-Type Sweet Potato", Journal of the Chinese Agricultural Chemical Society, 1989, 27(1), 97–107.

Smith, *Potatoes: Production, Storing, Processing*, 2nd ed., 1979, pp. 619–627.

Lynch et al., *Citric Acid and Potassium Contents of Russet Burbank Potato in Alberta*, Can. J. Plant Sci., vol. 65, pp. 793–795 (Jul. 1985).

Nafis et al., *Inhibition of Sugar-Amine Browning by Aspartis and Glutamic Acids*, J. Agric. Food Chem., vol. 31, pp. 1115–1117 (1983).

Borenstein, *The Role of Ascorbic Acid in Foods*, Food Technology, pp. 98–99 (Nov. 1987).

Liao et al., *Selected Reactions of L-Ascorbic Acid Related to Foods*, Food Technology, pp. 104–107, 111 (Nov. 1987).

*Primary Examiner*—Arthur L. Corbin
*Attorney, Agent, or Firm*—Brumbaugh, Graves, Donohue & Raymond

[57] ABSTRACT

This invention relates to a process for manufacturing potato chips using chemically treated frozen potatoes which exhibit the good quality of promptly harvested potatoes. Potato slices are dipped in a heated solution containing ultraphosphate. Subsequently, the dipped slices are frozen and stored. Eventually, the frozen slices are thawed and fried for consumption.

2 Claims, No Drawings

PROCESS FOR MANUFACTURING POTATO CHIPS

BACKGROUND OF THE INVENTION

This invention relates to a process for manufacturing potato chips using frozen potatoes as material. Generally, the quality of the potato chips, for example, the taste, the flavor and the color shows the best when promptly harvested potatoes are used. But, stored potatoes must be used as material when potato chips are manufactured in non-harvest time. The quality of potato chips using stored potatoes is degraded during storage because of budding, decay, loss of weight, loss of nutrients and an increase of reductive glycoside. Therefore, the better quality potato chips cannot be obtained using stored potatoes as material. To solve the above problems, frozen potatoes have been used; but, in the process of thawing the potatoes, an enzyme effect alters the color and lessens the quality of the potato chips.

SUMMARY OF THE INVENTION

The object of this invention is to provide a process for manufacturing potato chips using chemically treated frozen potatoes which exhibit the good quality of promptly harvested potatoes.

DETAILED DESCRIPTION OF THE INVENTION

The process for manufacturing potato chips using this invention is the following: After washing, peeling and cutting a potato, a sliced potato is prepared. The dipping solution for the sliced potato is selected from the group composed of 0.2–1.0% solution by weight of ultraphosphate; the mixed solution of 0.05–0.3% by weight of citric acid and 0.1–0.5% by weight of ascorbic acid; the mixed solution of 0.05–0.3% by weight of citric acid, 0.05–0.4% by weight of ascorbic acid and 0.01–0.2% by weight of E.D.T.A.; and the mixed solution of 0.05–0.3% by weight of citric acid, 0.2–1.0% by weight of ultraphosphate and 0.05–0.2% by weight of E.D.T.A.

And the dipping solution is heated to 40°–50° C. The sliced potato is then dipped in this solution for 3–5 minutes. After dipping from the solution, the potato is rapidly freezed to the degree at −40°∼−60° C. for 5∼30 minutes. And then the freezing temperature keeps to be about −20° C. for the storage of the frozen potato. Before manufacturing the potato chip, the frozen potato is thawed at 30°∼80° C. The further process for manufacturing a potato chip accords with the known process in this fields.

The potato chip made of the frozen potato dipped in this mixed solution exhibits the good quality in the taste, the flavor and the color despite the long storage of frozen potato. And the ultraphosphate used in mixed solution is the highly condensed phosphate in which the composition ratio of $Na_2O/P_2O_5$ is less than 1.

EXAMPLES

The present invention is explained in more detail in the following examples. These examples, however, are only illustrative and are not to be regarded as limitations for the scope of this invention.

EXAMPLE 1

The potato was washed, peeled and sliced in 1.5 mm thickness. And the starch in the surface of sliced potato was washed. The dipping solution containing 0.5% by weight of ultraphosphate was heated to 40°∼50° C. The sliced potato was then dipped in this solution for 3∼5 minutes. After dipping from the solution, the potato was rapidly freezed to the degree at −40° C. And the frozen potato has been stored below −20° C. for 7 months. The frozen potato was thawed before manufacturing the potato chips. An the potato chip was prepared by frying the potato at 170°∼190° C. for 1.5 minutes using the vegetable oil, for example, ricebran oil, palm oil or cotton seed oil.

EXAMPLE 2

The potato chip was prepared in the same manner as in example 1 except that the mixed solution of 0.1% by weight of citric acid and 0.3% by weight of ascorbic acid was used instead of 0.5% by weight of ultraphosphate.

EXAMPLE 3

The potato chip was prepared in the same manner as in example 1 except that the mixed solution of 0.1% by weight of citric acid, 0.2% by weight of ascorbic acid and 0.05% by weight of E.D.T.A. was used instead of 0.5% by weight of ultraphosphate.

EXAMPLE 4

The potato chip was prepared in the same manner as in example 1 except that the mixed solution of 0.15% by weight of citric acid, 0.3% by weight of ascorbic acid and 0.05% by weight of E.D.T.A. was used instead of 0.5% by weight of ultraphosphate.

COMPARATIVE EXAMPLE 1

The promptly harvested potato was washed, peeled and sliced in 15. mm thickness. And the starch in the surface of sliced potato was washed. The potato chip was prepared by frying the potato at 170°∼190° C. for 1.5 minutes using the vegetable oil, for example, ricebran oil, palm oil or cotton seed oil.

COMPARATIVE EXAMPLE 2

The potato chip was prepared in the same manner of comparative example 1 except that the stored potato at 6°∼8° C. in 85∼95% humidity for 7 month was used instead of the promptly harvested potato.

Table 1 shows the quality comparison among the examples of this invention, comparative example 1 and comparative example 2

TABLE 1

|  | Examples of this invention | Comparative example 1 | Comparative example 2 |
|---|---|---|---|
| Color* | 60∼70 | 65∼75 | 30∼50 |
| Chewing feeling** | 8 | 9 | 7 |
| Flavor** | 9 | 10 | 5 |
| Taste** | 9 | 10 | 5 |

*The number of the color is using the AGTRON (Model E-5F, Magnuson Engineers, Inc. the brightest number 100: the darkest number 0).
**The number of the chewing feeling, flavor and taste is determined by the trained panelist.
(The best is 10)

We claim:

1. A process for manufacturing potato chips using chemically treated frozen potatoes which consists essentially of:
   (a) washing, peeling and slicing potatoes to obtain potato slices;
   (b) preparing a heated dipping solution having a concentration of 0.2-1.0% by weight of ultraphosphate, wherein the dipping solution is heated to a temperature of 40°-50° C.;
   (c) dipping potato slices in the heated dipping solution for 3-5 minutes;
   (d) rapidly freezing the dipping potato slices a −40° to −60° C. for 5 to 30 minutes;
   (e) storing the frozen potato slices at about −20° C.;
   (f) thawing the frozen potato slices at about 30°-80° C; and
   (g) frying the thawed potato slices in vegetable oil.

2. A process for manufacturing potato chips using chemically treated frozen potatoes which consists essentially of:
   (a) washing, peeling and slicing potatoes to obtain potato slices;
   (b) preparing a heated dipping solution comprising a mixture of 0.05-0.3% by weight of citric acid, 0.2-1.0% by weight of ultraphosphate and 0.05-0.2% by weight of E.D.T.A., wherein the dipping solution is heated to a temperature of 40°-50° C.;
   (c) dipping potato slices in the heated dipping solution for 3-5 minutes;
   (d) rapidly freezing the dipped potato slices at −40° to −60° C. for 5 to 30 minutes;
   (e) storing the frozen potato slices at about −20° C.;
   (f) thawing the frozen potato slices at about 30°-80° C.; and
   (g) frying the thawed potato slices in vegetable oil.

* * * * *